April 28, 1931.    H. W. ROGERS    1,802,480
SOUND AMPLIFYING APPARATUS
Filed Jan. 9, 1928    2 Sheets-Sheet 2
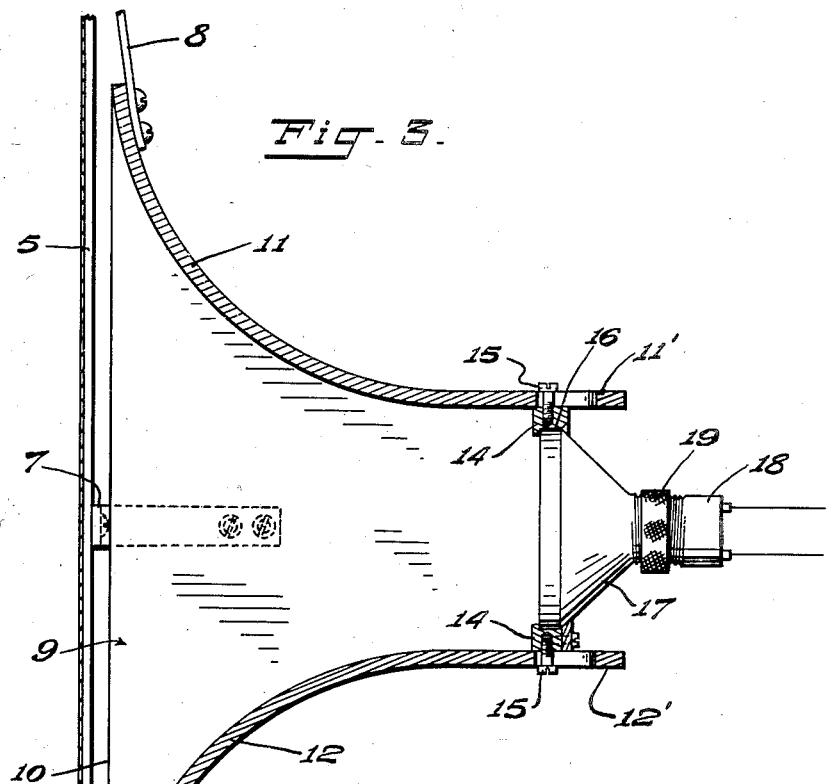
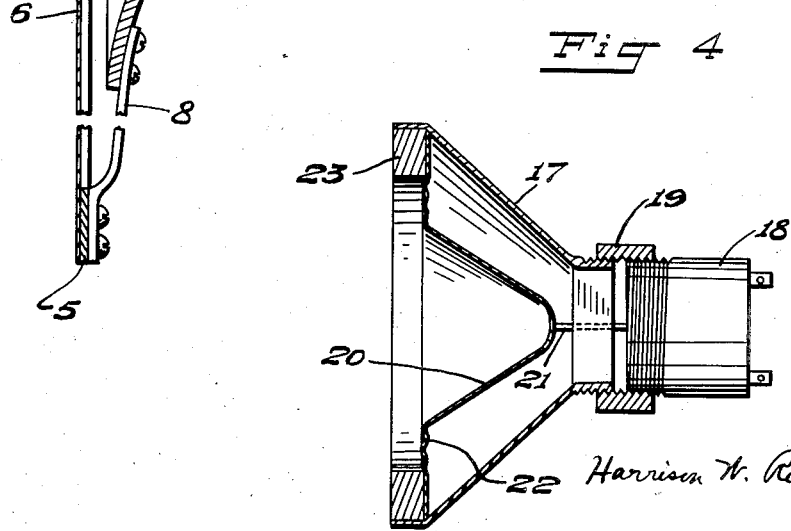
Inventor
Harrison W. Rogers.
By
Attorney Patented Apr. 28, 1931

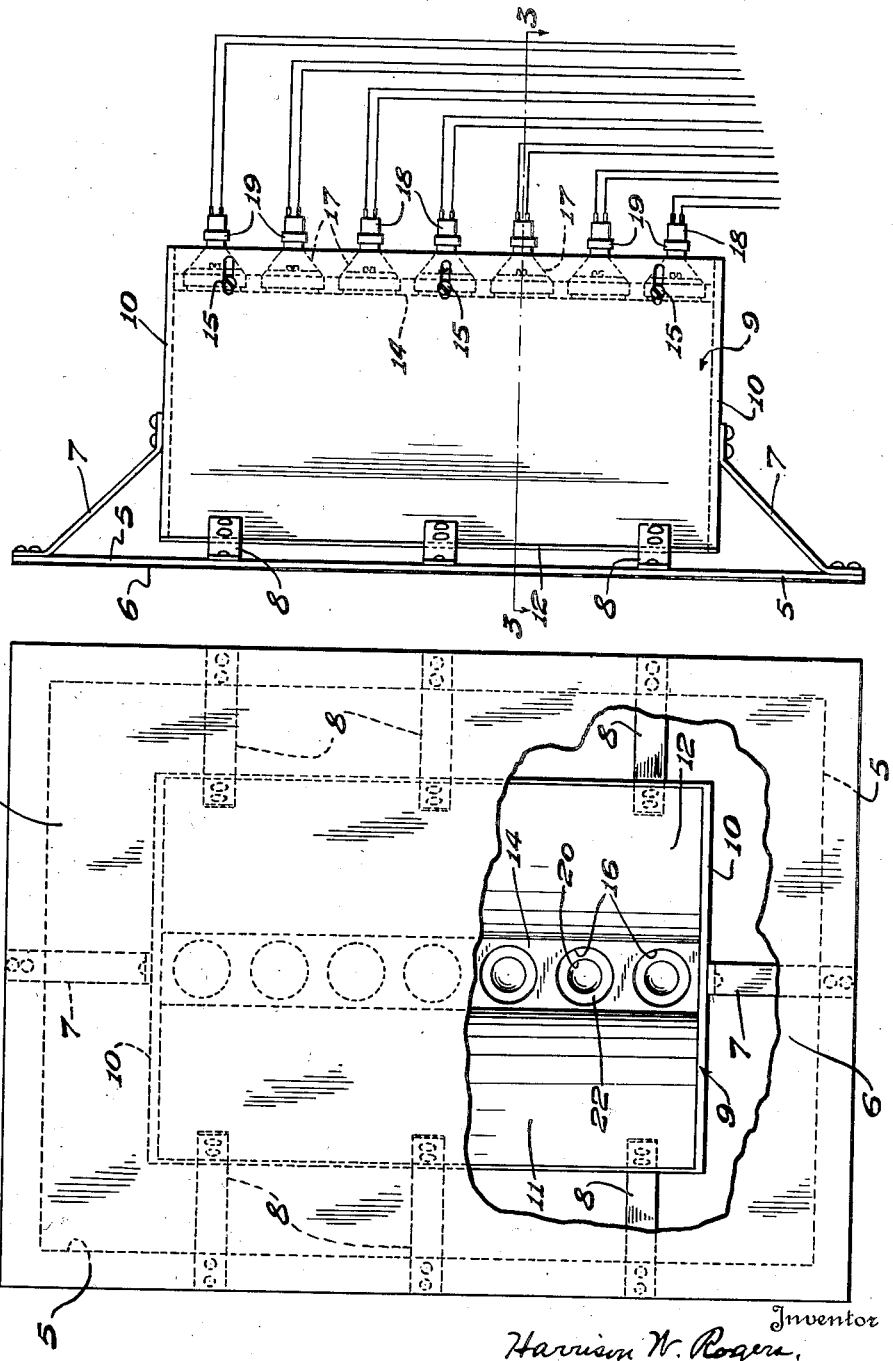

1,802,480

UNITED STATES PATENT OFFICE

HARRISON W. ROGERS, OF NEW YORK, N. Y.

SOUND-AMPLIFYING APPARATUS

Application filed January 9, 1928. Serial No. 245,618.

This invention relates to improvements in sound amplifying apparatus, one of the objects of the invention being the provision of a "loud speaker" especially designed for use with synchronized motion pictures and in which the motion picture screen is employed as the support for the amplifying horn and the unit or units used in conjunction therewith.

Another object of this invention is the construction of a sound amplifying means which will cause the sound to emanate from the screen so as to add great reality to the synchronized sound and motion picture, regardless of the relative positions of the audience to the screen.

Still another object of the present invention is the provision of a plural loud speaker in which the cones are so disposed upon and within a single support as to provide a wide smooth fan of sound from the open cone side thereof, thus providing a cooperation of sound amplification of the most harmonious possible range.

With the foregoing and other objects in view, the invention resides in the construction and arrangement of motion picture screen and electrical sound amplifying apparatus as will presently appear.

In the accompanying drawings:—

Figure 1 is a front elevation of a motion picture screen, partly broken away to show the sound amplifier in place.

Figure 2 is a side elevation thereof.

Figure 3 is a cross section taken on line 3—3 of Figure 2.

Figure 4 is an enlarged detail view of the cone mount.

Referring to the drawings, the number 5 designates the frame of the screen 6, this being indicative of any screen structure that may be employed in motion picture production.

The brackets 7 and 8 are supported by the frame and in turn support the horn 9, which as here shown consists of the two end plates 10 and the two curved sides 11 and 12, which are spaced at the rear and formed with the relatively flat edges 11' and 12'.

The spacing member or strip 14 is adjustably and removably mounted between the edges by means of the fastenings 15, and is provided throughout its area with a plurality of openings 16; while adjacent each opening upon the rear of the strip or support is a frame 17, of each electric sound reproducing unit 18.

This unit is adjustable to regulate the tension upon its cone 20, by means of the rings 19, which is a right and left hand screw connection between the support and the unit and thus regulates the tension of the cone vibrating rod 21 so that the proper movements are imparted to the cone. Each cone is flexibly attached to the support by the ring 22 of flexing material, and may be attached direct to the support or to a supporting ring 23 as shown in Figure 4. The units here shown as seven in number are disposed and supported in any desirable manner to effect the best results, and are connected in parallel with a circuit, not shown.

It is desirable, however, that the units be mounted adjustably to permit their adjustment in order that the air chamber may be minimized, and each is so mounted that an individual adjustment may be made for each to obtain the best results.

By mounting the horn at the rear of the screen, the sounds generated therefrom will be audible through and at the screen so that the best results possible are obtainable in the rendition of synchronized motion pictures.

By making the units adjustable with relation to the exponential flare and as each unit is individually adjustable a further means is provided by which the best possible rendition is obtained.

It is also possible to arrange the horn so that the flare may be adjustable and so that the flat ends 10 may be adjusted.

When found desirable, the exponential flare may terminate with and be substantially a part of the frame 5, which at these points will be bevelled to conform to the flare as the outlet edges thereof.

It in some cases is also desirable to have the flare extend beyond the outside edges of the screen frame, it being the intent of this invention to so combine with the screen and its frame an exponentially flared amplifying horn of a type to produce the best sound qualities without having the usual "horn sounds" and this particular arrangement is the nearest approach to the natural sounds that has heretofore been obtained.

I claim.

1. The combination with a motion picture screen having a rigid frame, of a sound amplifying apparatus having a horn flared upon two sides, means for attaching the front edges of the two sides of the horn to said frame, rear edges of the two sides being substantially parallel, a spacing strip adjustably mounted between the parallel edges, and a sound reproducing mechanism supported in the spacing strip.

2. The combination as claimed in claim 1 in which the spacing strip is provided with a plurality of openings therethrough, and in which a plurality of cone loud speakers, one to each opening, is attached to said strip.

3. The combination with a motion picture screen through which sound waves are permeable of a sound directing medium attached to and supported from the rear face thereof, and a plurality of loud speaker units associated with said medium and disposed one above the other in a series and adapted to be operated simultaneously to produce a wide smooth fan of sound waves to and through the screen.

4. The combination as claimed in claim 3, in which a plurality of cone speakers constitute the sound reproducing units and are disposed with their flared ends in the same plane and in spaced relation.

In testimony whereof I affix my signature.

HARRISON W. ROGERS.